United States Patent [19]
Spencer

[11] 4,182,340
[45] Jan. 8, 1980

[54] HOOF REPAIR

[76] Inventor: Dudley W. C. Spencer, 619 Shipley Rd., Wilmington, Del. 19809

[21] Appl. No.: 835,297

[22] Filed: Sep. 21, 1977

Related U.S. Application Data

[63] Continuation-in-part of Ser. No. 762,394, Jan. 26, 1977, Pat. No. 4,116,278, which is a continuation-in-part of Ser. No. 614,766, Sep. 18, 1975, Pat. No. 4,013,126, which is a continuation-in-part of Ser. No. 426,446, Dec. 20, 1973, Pat. No. 3,917,000, which is a continuation-in-part of Ser. No. 71,121, Sep. 10, 1970, Pat. No. 3,664,428, and Ser. No. 252,546, May 12, 1972, Pat. No. 3,782,473.

[51] Int. Cl.² .................................................. A01L 15/00
[52] U.S. Cl. .................................................. 128/336
[58] Field of Search ........................ 168/4, 17, DIG. 1; 128/336

[56] References Cited

U.S. PATENT DOCUMENTS 2,992,584   7/1961   Light .................................. 24/143 R

OTHER PUBLICATIONS

"The Repair of Hoof Cracks with Acrylic," *Journal of the American Veterinary Medical Association*, vol. 148, No. 4, Feb. 15, 1966.

*Primary Examiner*—Russell R. Kinsey
*Assistant Examiner*—Robert P. Swiatek
*Attorney, Agent, or Firm*—Connolly and Hutz

[57] ABSTRACT

A crack in a horse's hoof is repaired by forming holes through the hoof on opposite sides of the crack, threading an elongated strand or suture through the holes in the hoof and filling the crack with adhesive material which enters into the air spaces of the strand to thereby prevent the crack from enlarging.

7 Claims, 10 Drawing Figures

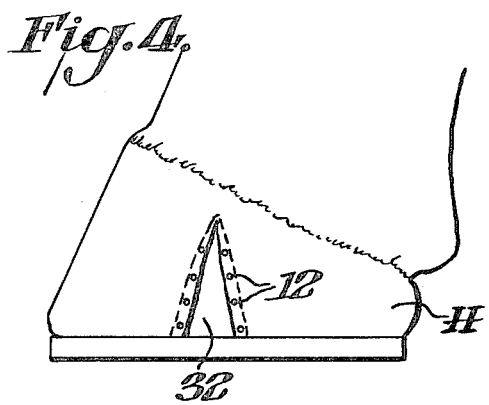
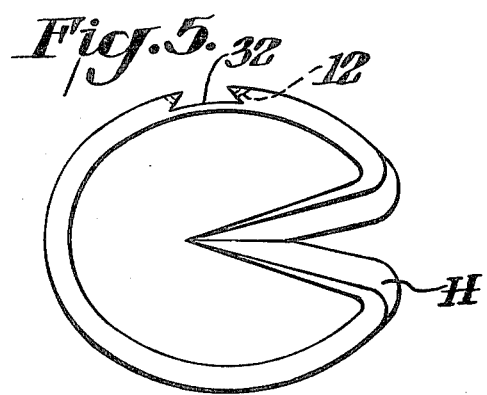
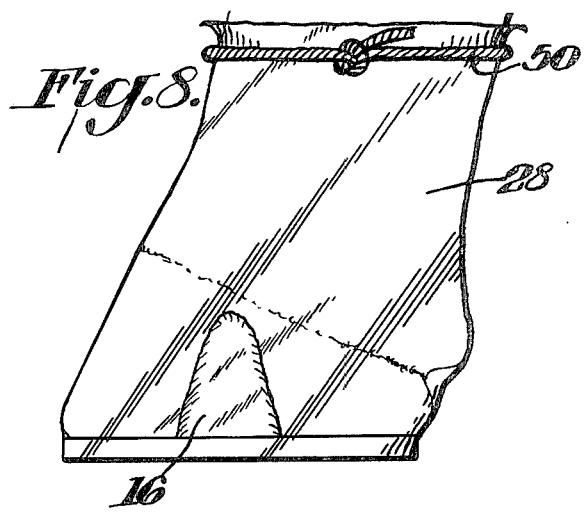
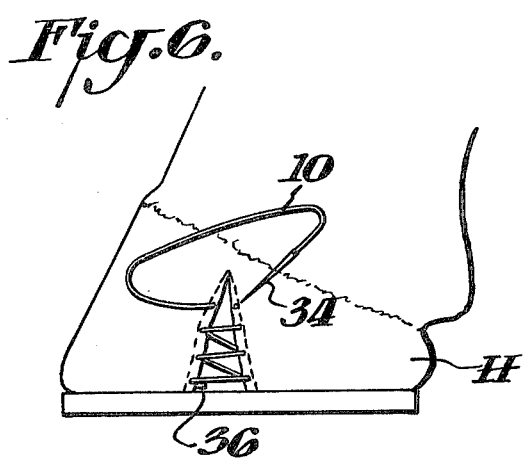
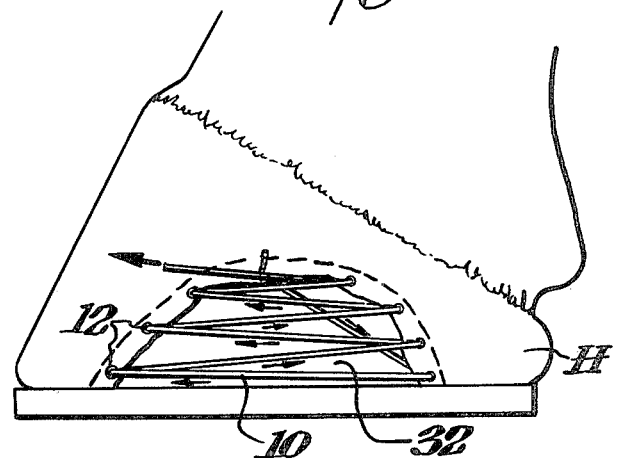
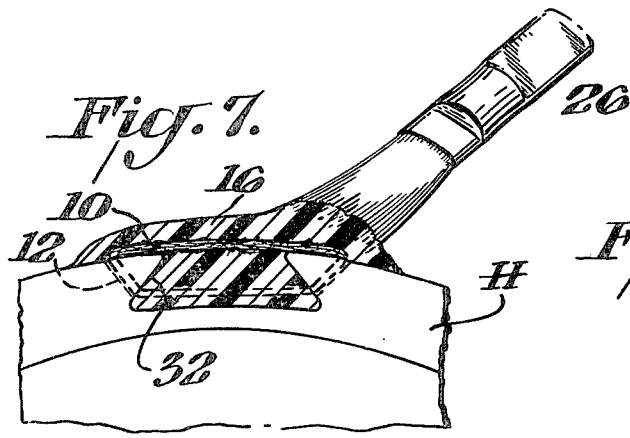
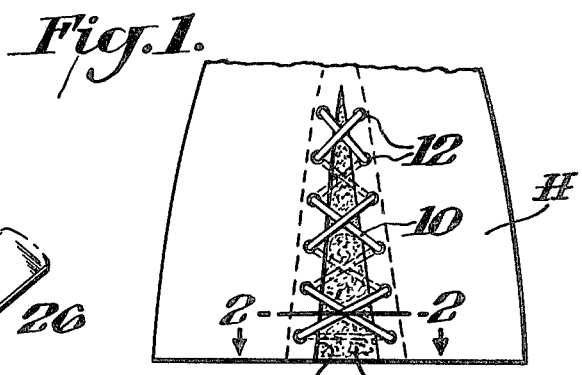
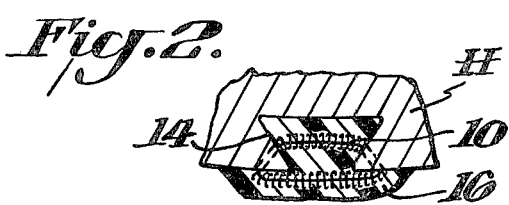

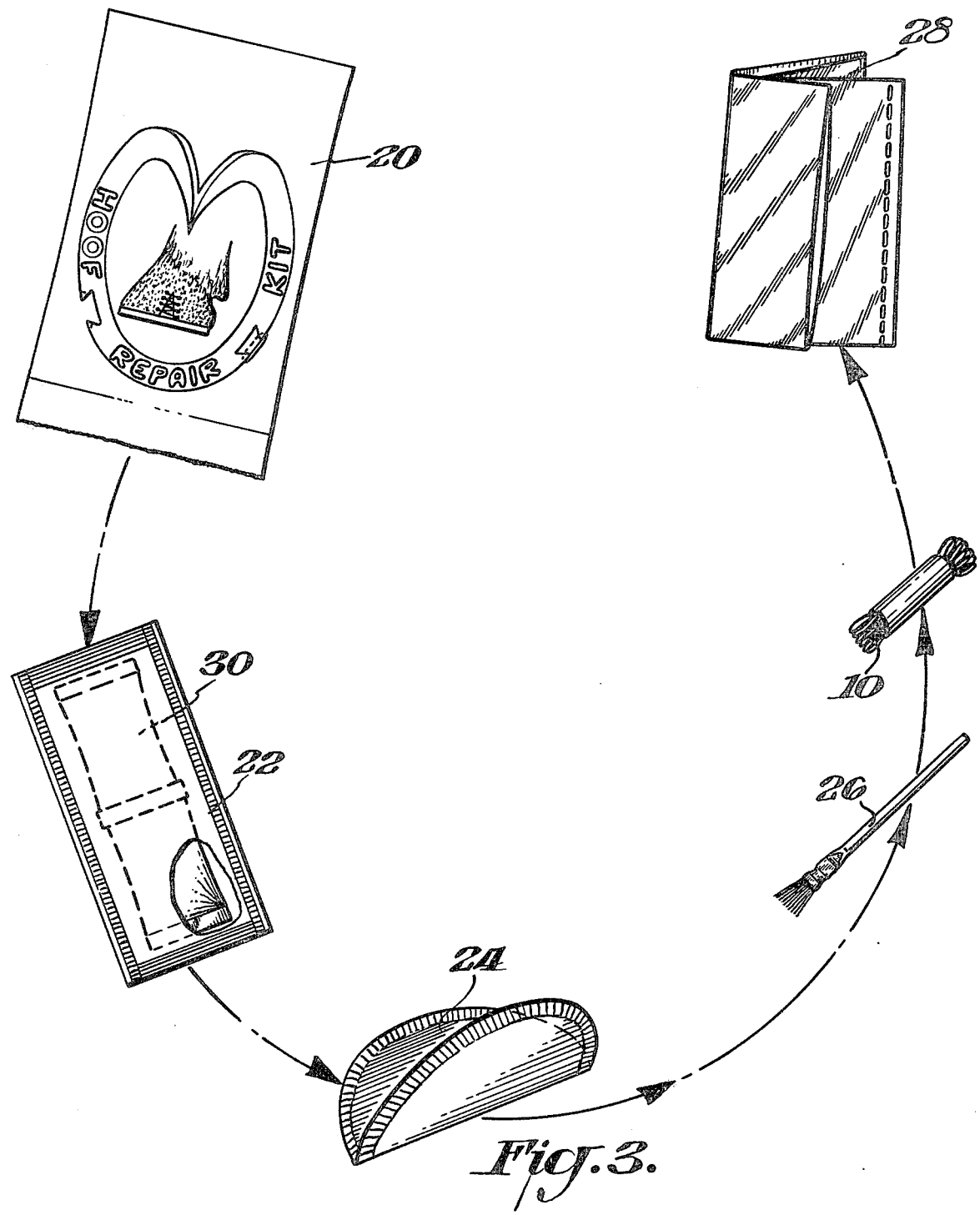
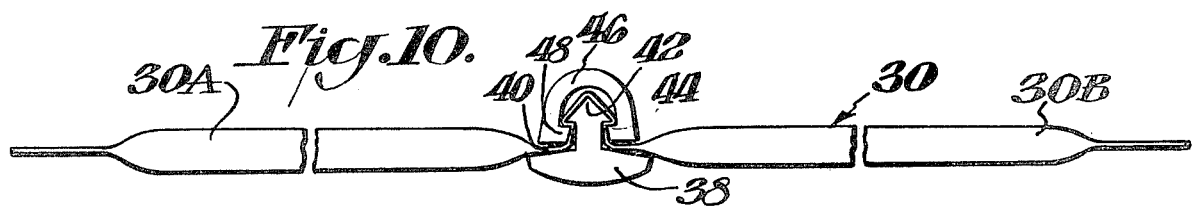

ofdd
HOOF REPAIR

CROSS-REFERENCE TO RELATED APPLICATIONS

This application is a continuation-in-part of Ser. No. 762,394, filed Jan. 26, 1977 now U.S. Pat. No. 4,116,278 which in turn is a continuation-in-part of Ser. No. 614,766, filed Sept. 18, 1975 and now U.S. Pat. No. 4,013,126. U.S. Pat. No. 4,013,126 is in turn a continuation-in-part of Ser. No. 426,446, filed Dec. 20, 1973 and now U.S. Pat. No. 3,917,000 which is a continuation-in-part of Ser. No. 71,121, filed Sept. 10, 1970 now U.S. Pat. No. 3,664,424 and Ser. No. 252,546, filed May 12, 1972 now U.S. Pat. No. 3,782,473.

BACKGROUND OF THE INVENTION

Various techniques are known in the art for treating horse's hoofs such as for repairing cracks therein. These techniques generally require a veterinarian, are time consuming and cause discomfort to the horse.

SUMMARY OF THE INVENTION

An object of this invention is to provide a method of treating horse's hoofs having cracks therein.

A further object of this invention is to provide such a method which overcomes the disadvantages generally attendant with the prior art.

A still further object of this invention is to provide a kit particularly adapted for use in such method.

In accordance with this invention holes are formed on opposite sides on the hoof and an elongated strand is threaded through the holes. The crack is filled with an adhesive material which also flows into the air spaces in the strand. The hoof may be inserted in a bag which presses against the adhesive filled crack during the curing action.

THE DRAWINGS

FIG. 1 is an elevation view of a hoof in accordance with this invention;

FIG. 2 is a cross-sectional view taken through FIG. 1 along the line 2—2;

FIG. 3 is a schematic view of the parts in a hoof repair kit in accordance with this invention; FIG. 4 is an elevation view of a hoof during one step of treatment in accordance with this invention;

FIG. 5 is a bottom plan view of the hoof shown in FIG. 4;

FIG. 6 is an elevation view of the hoof shown in FIGS. 4-5 in a later stage of treatment;

FIG. 7 is a plan view partly in section of the hoof during a still further stage of treatment;

FIG. 8 is an elevation view of a hoof in yet a further stage of treatment;

FIG. 9 is an elevation view of a hoof illustrating a further practice of this invention; and FIG. 10 is a side elevation view of an adhesive dispenser which is included in the kit shown in FIG. 3.

DETAILED DESCRIPTION

This application incorporates by reference thereto the disclosures in parent application Ser. No. 762,394 and parent application, now U.S. Pat. No. 4,013,126 as well as the aforenoted parent patents of those two cases. The following description, however, will be primarily directed to the departures from those prior cases except where repetition is desirable to facilitate the understanding of the present invention.

FIGS. 1-2 illustrate an embodiment of this invention which utilizes the concept of threading an elongated strand or suture 10 through holes 12 formed in the horse's hoof H. As indicated therein this embodiment is particularly useful for repairing cracks in the hoof such as quarter crack repairing. As illustrated therein holes 12 are formed on each side of crack 14, strand or suture 10 is threaded through holes 12 and a suitable adhesive 16 completely fills the crack and flows into the open structure of the strand 10 to thereby prevent the crack from enlarging. During the healing process, the hoof continues to grow from the coronet band. As the hoof wears away from normal contact with the ground, or is trimmed by a blacksmith, the adhesive wears away with the hoof or is trimmed, just as though the repaired area were a normal hoof wall.

The following description amplifies a preferred procedure for practicing the invention. In this preferred procedure a hoof repair kit is utilized which comprises a container 20 for housing a sealed envelope 22 containing a multi-component adhesive pouch as later described. Additionally, a working surface such as a paper plate 24 is disposed in the container 20, as well as an applicator 26, the strand or suture 10 and a flexible bag 28.

The invention can be practiced with either bare or shod hoofs. The hoof can be shod after treatment and if necessary nailing can be done through the repaired area as if the hoof were completely normal.

It is preferable that the invention be practiced by mixing the adhesive components at body temperature. Thus in, for example, cold weather dispensing envelope or pouch 30 which contains the adhesive should be removed from its outer envelope 22 and placed either in an incubator, in water that feels hot to the hand, or next to the user's body at the waist band.

As a preliminary step the hoof is thoroughly cleaned to assure proper adherence. The cleaning is done preferably with ether, acetone or any other suitable solvent. The hoof is first cleaned and the damaged area prepared as shown in FIGS. 4-5. In this respect an undercut 32 is formed with a suitable instrument such as a burr and holes 12 are drilled at an angle indicated in FIG. 5 through the undercut area. The holes may, for example, be formed by a drill bit 3/32 inches in diameter. The size of the holes would of course, vary in accordance with the size of the strand and preferably a hole size is selected for a tight fit. The entire area is cleaned and the damaged hoof is thoroughly cleaned down to the keratin with, for example, ether. All dirt, oil and medication are removed.

The next step in the process is to apply the strand or suture 10. FIG. 6, for example, shows one manner of application. In the form illustrated therein strand or suture 10 includes a pointed leader 34 which is, for example, inserted first through one of the lowermost holes 12 and then threaded through the remaining holes. The remote end 36 of strand 10 is fused so as to be larger than the diameter of holes 12 thus obviating the need for a knot. Various suitable threading techniques may be used in accordance with the invention. For example, during threading the strand is pulled tightly in the holes and the leader end is threaded under the strand without tying knots.

After the strand 10 has been threaded through the holes 12 the adhesive 16 is to be applied. FIGS. 3 and 10 illustrate a particularly suitable adhesive dispenser. As indicated therein a sealed outer envelope 22 such as made from plastic coated paper is provided for housing a commercially available mixing-dispenser envelope for the adhesive of the type, for example, marketed under the name Bipax. This dispenser includes a plastic pouch or envelope 30 (FIG. 10) which is divided into two compartments 30A and 30B by removable clamp means which includes an anchor member 38 having a generally flat base 40 terminating in a pointed edge 42 with shoulders 44 under edge 42. The pointed edge is longer than the width of envelope 30 (FIG. 3). The envelope is laid across edge 42 along a line generally bisecting envelope 30 and is clamped thereto by a U-shaped clip 46 so that a thin strip of envelope is formed separating envelope 30 into the compartments 30A and 30B. Each compartment contains one of the components of the mix which forms the adhesive. Clip 46 has inwardly extending free ends 48 which fit over edge 42 along the entire width of the dispenser with the free ends 48 disposed under shoulders 44 and pressing the dispenser into contact with the edge 42 to close communication between compartments 30A and 30B. Clip 46 is likewise longer than the width of envelope 30.

Adhesive 16 is of the type generally discussed in the aforenoted applications and patents and includes preferably an epoxy-like catalyst in one of the compartments that promotes rapid set-up times. Conveniently, the adhesive components may be mixed in the plastic pouch 30 by removing the seal or clamp 38, 46 which separates the two compartments. The components in the two compartments are then kneaded together with the use, for example, of a suitably available tool such as a screw driver handle or other smooth tool. After thorough mixing the adhesive is dispensed by cutting a corner of pouch 30 to squeeze the contents of the pouch onto paper plate 24. Mixing is continued on the plate 24 with brush 26. It has been found that complete mixing is accomplished in 1-2 minutes after removing the seal.

The next step in the hoof repair method is to place the hoof H into plastic bag 28 without tightening the bag. As shown in FIG. 7 adhesive 16 is then liberally applied with brush or applicator 26 over the entire damaged area preferably starting at the top. Care should be taken to fill the space behind suture or strand 10. After the adhesive 16 has been applied the plastic bag 28 is pulled up over the treated area and wrinkles are smoothed out from outside the bag. The smoother the bag the better the job will look. (FIG. 8 shows the bag in the attached position). The smooth finish is particularly desirable because it eliminates the need to rasp, since rasping can damage the strand. Plastic bag 28 may be held in place with tape or string 50 or by hand until the adhesive begins to jell which has been found to take about 3 minutes. After about 10 minutes of setting, bag 28 is preferably peeled away, which can be done easily when there is a sufficient adhesive set. If it is found that peeling is difficult, a longer wait of another minute or two would be indicated.

After about 30 more minutes the damaged area is cleaned up. This can be done by a rasp to carefully cut away the feather edges and, if necessary, to reduce the treated area to look and feel like the normal hoof. The horse may then resume normal activities after an overnight set.

Although the foregoing description has been directed to repairing a particular type of crack, such as a quarter crack, the concepts of this invention are not limited thereto. FIG. 9, for example, illustrates a damaged area other than quarter cracks which can be sutured by following the inventive technique. In general the same steps as previously described are used. The damaged area would again be undercut and holes drilled therearound with the strand 10 threaded in any suitable manner such as illustrated therein.

As previously pointed out the various equipment used in practicing the inventive method is advantageously housed in a single container 20 to form a kit. Strand 10 may be placed therein in a manner similar to conventional shoe laces by having the folded strand wrapped in an outer paper tube, as shown in FIG. 3. Container 20 is permanently sealed at one end and temporarily closed at the other end after the components 10 have been placed therein. Container 20 is made from material which is preferably cushioned such as layers of paper having cushioning means therebetween.

Plastic bag 28 likewise may be of any desirable construction and is of a size to permit a hoof to be inserted therein without too much wrinkling of the bag. Copending application Ser. No. 752,742 filed Dec. 21, 1976 discloses a use of a plastic bag in connection with a horse's hoof. The details of that application are incorporated herein by reference thereto.

Strand 10 may take any suitable form as discussed in the various aforenoted applications and patents. Preferably strand or suture 10 is of an open or pervious construction to permit the adhesive to work itself therein. Although the term "strand" has been used herein the term is meant to include a suture of single or multistrand construction. Suture 10 is preferably made multistrand construction with six loosely interwoven strands. Preferably each strand has a minor diameter of from 0.01 inches and a maximum diameter of 0.1 inches. Suture or strand 10 preferably has the same index of refraction as adhesive 16 so that the strand is not noticeably visible. Strand 10 may be made for example of acetate pre-formed with an epoxy coating for final form and flexibility. Strand 10 may likewise be made of Du Pont Nylon "Cordura" 4040 and preferably has 10 grams per denier. Preferably strand 10 has 24,000 filaments with a breaking strength of from 200-300 pounds, although the breaking strength may range from 20 to 1,000 pounds. The bulked filaments range may likewise be from 1,000 to 100,000 filaments. The bulked filaments are preferred to create a sponge effect for the adhesive which permits the strand to absorb the adhesive even if the strand becomes dirty. In the illustrated embodiment strand 10 includes a hard wedge cut leader 34 to facilitate the threading while the trailing end 36 is fused to avoid the necessity of tying a knot. If preferred, however, both ends can be wedge cut. Preferably, strand 10 is steam treated to make it antiseptic for wound closing without causing sepsis. Strand 10 is used for prosthesis hoof restorations and for repair of minor cracks while the adhesive alone may be used for cosmetic repair. The adhesive is selected to chemically bond the hydroxal end groups of the hoof Keratins ($OH^+$). In this way the adhesive alone can form a tough restoration without falling out.

What is claimed is:

1. A method of treating a horse's hoof having a crack therein comprising the steps of cleaning the crack in preparation for treatment thereof, forming holes through the hoof along the periphery of the crack, inserting a hard pointed leader successively through the holes with the leader being integral with an elongated multifilament strand consisting of bulked filaments which is of open construction and having exposed air spaces therein and without the necessity of moistening the strand, continuing to insert the leader through the holes until the strand is threaded back and forth across the crack, securing the strand in place without the necessity of knotting the strand, applying to the crack an adhesive material capable when cured of being shod with nails with the adhesive material flowing into the exposed air spaces of the strand, said strand acting as a sponge to absorb the adhesive and to form an intimate bond therewith, and permitting the adhesive material to cure in situ in the crack.

2. The method of claim 1 wherein the hoof is inserted in a bag which is pressed against the adhesive filled crack during curing thereof.

3. The method of claim 1 including forming an undercut along the crack, forming the holes by drilling through the undercut, cleaning the area being treated before applying the strand, and securing the ends of the strand to maintain the strand in place.

4. The method of claim 3 wherein the strand has a breaking strength of 200–300 pounds and bulked filaments of 1000–100,000 filaments, the strand being treated to be antiseptic, inserting the hoof in a flexible plastic bag before applying the adhesive, pulling the bag up over the treated area after the adhesive is applied, then smoothing out bag wrinkles from outside the bag, holding the bag in place at least until the adhesive begins to jell, peeling away the bag after the adhesive has sufficiently set, and rasping the treated area to conform to a normal hoof.

5. The method of claim 1 including using a strand which has substantially the same index of refraction as the adhesive and with the leader being wedge cut and with the strand having a fused hardened opposite end from the leader and a breaking strength of 20–1000 pounds, and securing the ends of the strand by pulling the strand tightly in the holes and threading the leader end under the strand without tying knots.

6. The method of claim 1 wherein the adhesive is a multi-component room temperature curing adhesive having its components packaged in separate compartments of a common container, including the steps of opening communication between the compartments and mixing the components therein after the strand has been threaded through the holes.

7. The method of claim 1 wherein the threading step is performed by starting at the bottom of the defect and threading from hole to hole on opposite sides of the defect toward the top of the defect to maximize the amount of strand spanning the defect.

* * * * *